United States Patent
Li et al.

(10) Patent No.: US 8,633,791 B2
(45) Date of Patent: Jan. 21, 2014

(54) ROTARY SOLENOID

(71) Applicant: Johnson Electric S.A., Murten (CH)

(72) Inventors: Yue Li, Hong Kong (CN); Mao Xiong Jiang, Shenzhen (CN); Chui You Zhou, Hong Kong (CN); Jin Yun Gan, Hong Kong (CN); Xiao Mei Yuan, Shenzhen (CN); Ying Chen, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 13/922,704

(22) Filed: Jun. 20, 2013

(65) Prior Publication Data

US 2013/0342296 A1 Dec. 26, 2013

(30) Foreign Application Priority Data

Jun. 21, 2012 (CN) .......................... 2012 1 0208393

(51) Int. Cl.
*H01F 7/08* (2006.01)
(52) U.S. Cl.
USPC ............................................. 335/272; 310/36
(58) Field of Classification Search
USPC ..................... 335/272; 310/36–39; 251/129.11–129.13
See application file for complete search history.

(56) References Cited

U.S. PATENT DOCUMENTS

| | | | | | |
|---|---|---|---|---|---|
| 2,844,743 | A | * | 7/1958 | Watson | 310/37 |
| 2,866,109 | A | * | 12/1958 | Watson | 310/37 |
| 3,022,432 | A | * | 2/1962 | Timmer et al. | 310/37 |
| 3,435,394 | A | * | 3/1969 | Egger | 335/272 |
| 3,553,619 | A | * | 1/1971 | Skrobisch | 335/272 |
| 3,750,065 | A | * | 7/1973 | Myers | 335/272 |
| 3,992,688 | A | * | 11/1976 | Keck | 335/272 |
| 4,275,371 | A | * | 6/1981 | Vogel | 335/272 |
| 4,447,793 | A | * | 5/1984 | Gray | 333/106 |
| 4,730,177 | A | * | 3/1988 | McSparran | 335/272 |
| 6,518,685 | B2 | * | 2/2003 | Nelson | 310/191 |
| 8,415,850 | B2 | | 4/2013 | Li et al. | |
| 2008/0018208 | A1 | | 1/2008 | Zafferri | |

FOREIGN PATENT DOCUMENTS

| | | |
|---|---|---|
| JP | 55103070 | 8/1980 |
| JP | 2211049 A | 8/1990 |

* cited by examiner

*Primary Examiner* — Ramon Barrera

(74) *Attorney, Agent, or Firm* — Muncy, Geissler, Olds & Lowe, PLLC

(57) ABSTRACT

A rotary solenoid (1) includes a stator (10), a rotor (40), and a torsion spring (50) connected between the stator (10) and the rotor (40). The stator (10) includes an armature (13) having three stator poles (14, 15) cooperatively defining a substantially cylindrical space (18) and a coil (19) wound about one of the stator poles (14). The rotor (40) includes a shaft (42) rotatably assembled to the stator (10) and a rotor core (44) fixed to the shaft (42) and received in the cylindrical space (18). The rotor core (44) has three rotor poles (43) corresponding to the stator poles (14, 15). The rotor (40) stays at a first position under the force of the torsion spring (50) and rotates to a second position under the force of the torsion spring (50) and the magnetic force of stator (10) when the coil (19) is powered.

20 Claims, 4 Drawing Sheets

US 8,633,791 B2

ROTARY SOLENOID

CROSS REFERENCE TO RELATED APPLICATIONS

This non-provisional patent application claims priority under 35 U.S.C. §119(a) from Patent Application No. 201210208393.6 filed in The People's Republic of China on Jun. 21, 2012.

FIELD OF THE INVENTION

The present invention relates to rotary solenoids, and particularly, to a rotary solenoid having large torque output.

BACKGROUND OF THE INVENTION

A rotary solenoid includes a stator and a rotor. The stator includes a rectangular iron core with two stator poles extending from two opposing inner surfaces thereof and two coils wound about the two stator poles. The rotor is located between the two stator poles and includes two rotor poles extending in opposing direction. During operation, when the two coils are activated, the two stator poles generate a magnetic field that interacts with and attracts the two rotor poles, thereby driving the rotor to rotate. However, as there are two coils wound around the two stator poles, saturation flux density in the iron core and the stator poles is high. Flux path of this rotary solenoid is rectangular and is relatively long. Further, the interaction area between the stator pole and the rotor pole is small because there are only two rotor poles. All these features would limit the output torque of the solenoid.

The present invention aims to provide a new solenoid having high output torque.

SUMMARY OF THE INVENTION

Accordingly, an embodiment of the present invention provides a rotary solenoid includes a stator, a rotor, and a torsion spring coupled between the stator and the rotor. The stator includes an armature having two ends and a central portion there between, a first stator pole extending from the central portion, a second stator pole and a third stator pole each extending from a corresponding one of the two ends of said armature, and a coil wound about said first stator pole. The rotor includes a shaft rotatably assembled to the stator and a rotor core fixed to the shaft and disposed in the cylindrical space. The rotor core has three rotor poles corresponding to the stator poles. The rotor stays at a first position under the force of the torsion spring and rotates to a second position in response to an electric current flowing through said coil.

Another embodiment of the present invention provides a rotary solenoid includes a stator, a rotor, and a torsion spring coupled between the stator and the rotor. The stator includes an armature having three stator poles cooperatively defining a substantially cylindrical space, and a coil wound about one of the stator poles. The rotor includes a shaft rotatably assembled to the stator and a rotor core fixed to the shaft and disposed in the cylindrical space. The rotor core has three rotor poles corresponding to the stator poles. The rotor stays at a first position under the force of the torsion spring and rotates to a second position in response to an electric current flowing through said coil.

A further embodiment of the present invention provides a rotary solenoid includes a stator, a rotor, and a torsion spring. The stator includes an armature having three stator poles and a coil wound about one of the stator poles. The rotor includes a shaft rotatably assembled to the stator and a rotor core fixed to the shaft and having three rotor poles each located approximately between tow of said three stator poles. At the first position, a circumferential end of each of said three rotor poles overlaps with an adjacent stator pole while an opposing circumferential end of each of said three rotor poles spaces from another adjacent stator pole in the circumferential direction. The torsion spring is strip-shaped with one end thereof fixed coupled with the stator and an opposing end thereof running radially through the shaft, configured for forcing said rotor to a first position. The rotor rotates to a second position in response to an electric current flowing through said coil.

In embodiment of the present invention, as the rotary solenoid has three stator poles and three rotor poles, the interaction area between the stator and the rotor is relatively big. In addition, due to the flux in the stator pole wound by the coil is divided into two parts at the other two stator poles, the saturation flux density is therefore low. There features benefit the output torque of the rotor.

BRIEF DESCRIPTION OF THE DRAWINGS

Preferred embodiments of the invention will be described herein below, by way of example only, with reference to the drawings. In the figures, identical or like structures, elements, or parts that appear in more than one figure may be labeled with the same reference numerals in all figures. Dimensions of components and features shown in the figures are generally chosen for convenience and clarity of presentation and are not necessarily drawn to scale.

DETAILED DESCRIPTION OF THE PREFERRED EMBODIMENTS

Figure 1:
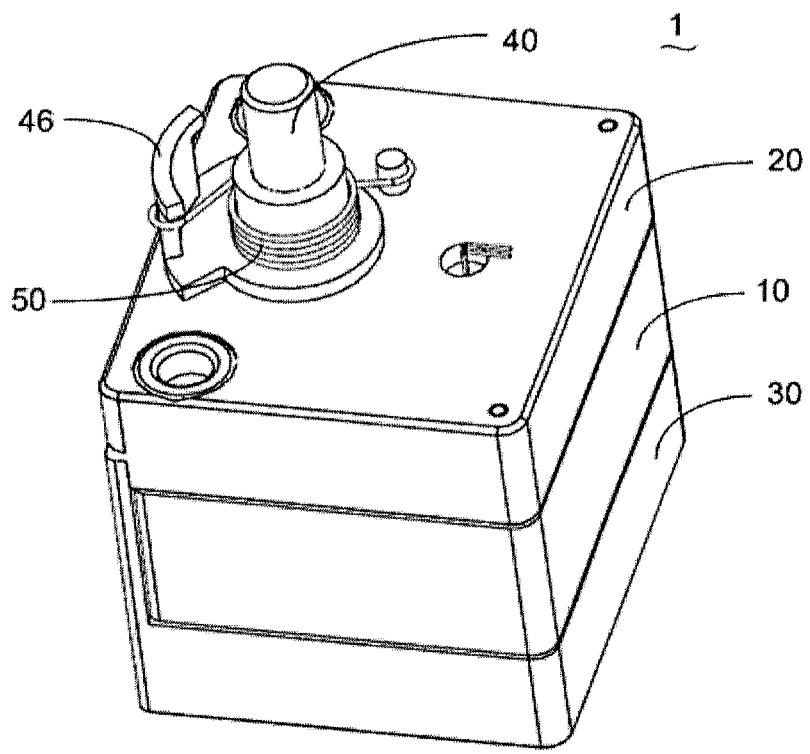
FIG. 1 illustrates a rotary solenoid in accordance with an embodiment of the present invention.
Figure 2:
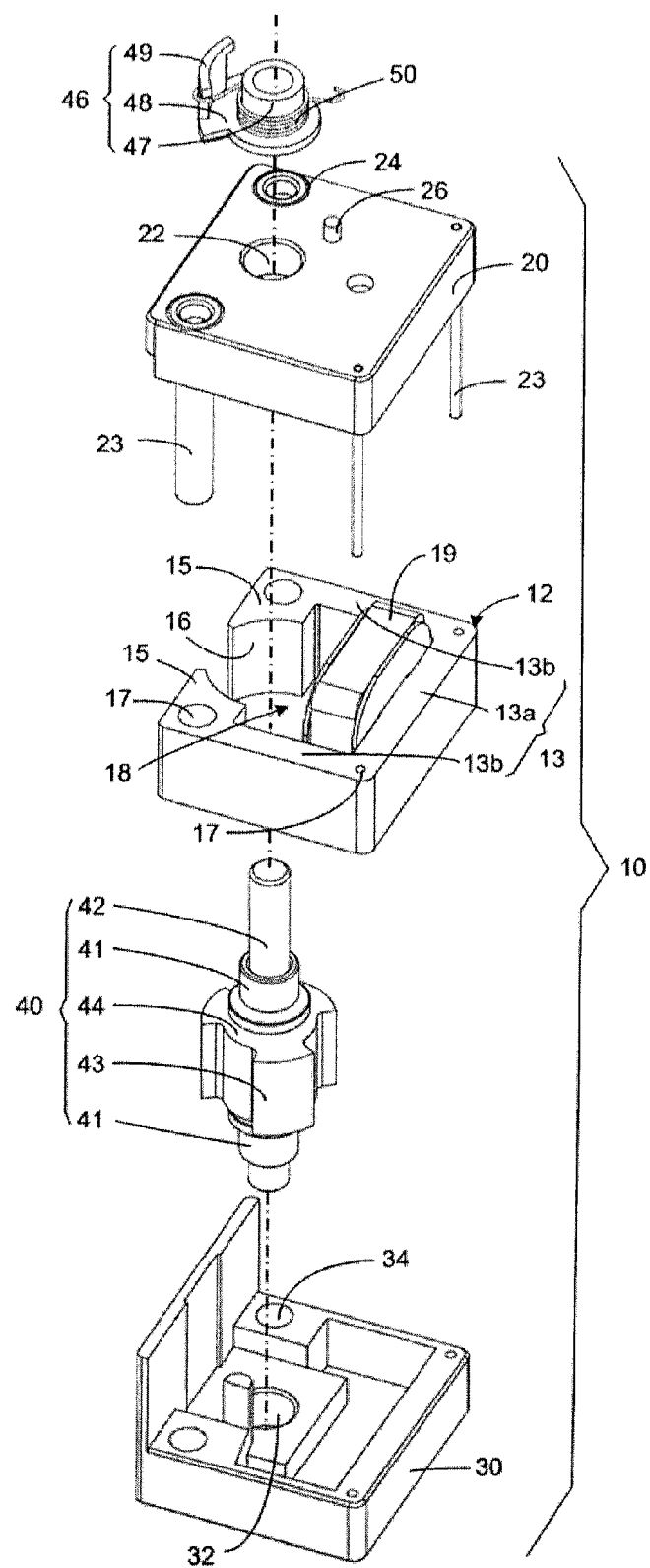
FIG. 2 is a partially exploded view of the solenoid of FIG. 1.

Referring to FIGS. 1 and 2, a rotary solenoid 1 in accordance with an embodiment of the present invention can be used to drive a device, such as a valve (not shown), to change between two different states. The rotary solenoid 1 includes a stator 10, a rotor 40 rotatably housed in the stator 10, and a torsion spring 50.

The stator 10 includes a substantially E-shaped stator core 12, a coil 19, a first cover 20, and a second cover 30. The stator core 12 includes an armature 13, a first stator pole 14 (shown in FIG. 4), and two second stator poles 15. The armature 13 includes an elongated central portion 13a and two end portion 13b parallel to each other and extending from two opposing ends of the central portion 13a. The first stator pole 14 protrudes perpendicularly from the middle of the central portion 13a. The two second stator poles 15 protrude from the distal ends of the two end portions 13b, extending towards each other. End surfaces 16 of the first and second stator poles 14 and 15 are curved, spaced from each other and cooperatively defining a substantially cylindrical space 18. The stator core 12 further defines four first through holes 17 at the corners thereof. In accordance with a preferred embodiment, the first and second stator poles 14 and 15 are integrally formed with the armature 13. A coil 19 is wound about the first stator pole 14.

A first cover 20 and a second cover 30 are arranged at two opposing sides of the stator core 12. The first and second covers 20 and 30 respectively include a fixing hole 22 and 32, and further respectively define four second through holes 24 and 34 at the corners thereof. The first cover 20 further includes a motion stop pillar 26 that protrudes from a surface of the first cover 20 facing away from the second cover 30 and is adjacent to the fixing hole 22.

The rotor 40 includes a shaft 42. A rotor core 44 and a spring assembly 46 coaxially fixed to the shaft 42 by tight-fitting, for example. The rotor core 44 is made from a paramagnetic or magnetically conductive material, such as steel or iron. The rotor core 44 includes three rotor poles 43 evenly arranged along the circumferential direction of the shaft 42. The rotor core 44 is received in the cylindrical space 18 defined by the first and second stator poles 14 and 15 of the stator 10, while two end portions of the shaft 42 at the opposite sides of rotor core 44 are assembled to the fixing hole 22 and 32 via two bearings 41. In this way, the rotor 40 can rotate with respect to the stator 10. Four bolts 23 assemble the first cover 20, the stator core 12, and the second cover 30 together through corresponding second through holes 24 on in the first cover 20, the first through holes 17 in the stator core 12, and the second through holes 34 in the second cover 30. The spring assembly 46 includes a tube 47 fixed to a portion of the shaft 42 that extends out of the first cover 20, a flange 48 extending from the tube 47, and a abutting element 49 extending substantially along the axial direction of the shaft 42 from the flange 48. A torsion spring 50 loosely sleeves the tube 47, with its two ends assembled to the abutting element 49 and the motion stop pillar 26 on the first cover 20.

Figure 3:
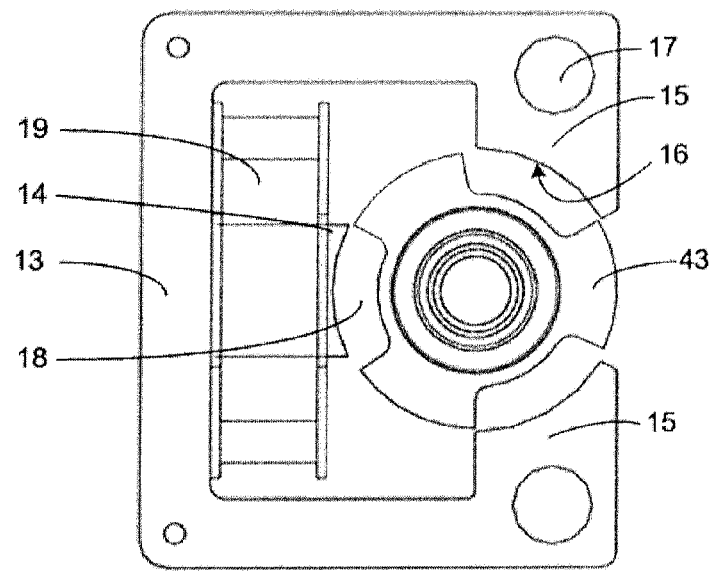
FIG. 3 is a plan view illustrating a stator core and a rotor of the rotary solenoid of FIG. 1 with the rotor at a first position.

When there is no electric current flowing through the coil 19, the torsion spring 50 force the rotor 40 to stay at a first position shown in FIG. 3 with the abutting element 49 in contact with the motion stop pillar 26 on the first cover 20. At this first position, each of the three rotor poles 43 is approximately located between two corresponding stator poles 14 and 15 (or two stator poles 15 and 15). A circumferential end of the rotor pole 43 aligns with an adjacent stator pole 14 or 15 in the circumferential direction, while the other circumferential end of the rotor pole 43 is spaces from the other adjacent stator pole 14 or 15. In accordance with a preferred embodiment, the two ends of each of the rotor poles 43 makes an angle between 50 and 60 degrees with respect to the central axis of the shaft 42, and the two ends of each of the stator poles 14 and 15 is about one to five degrees greater than that of the corresponding rotor pole 43.

Figure 4:
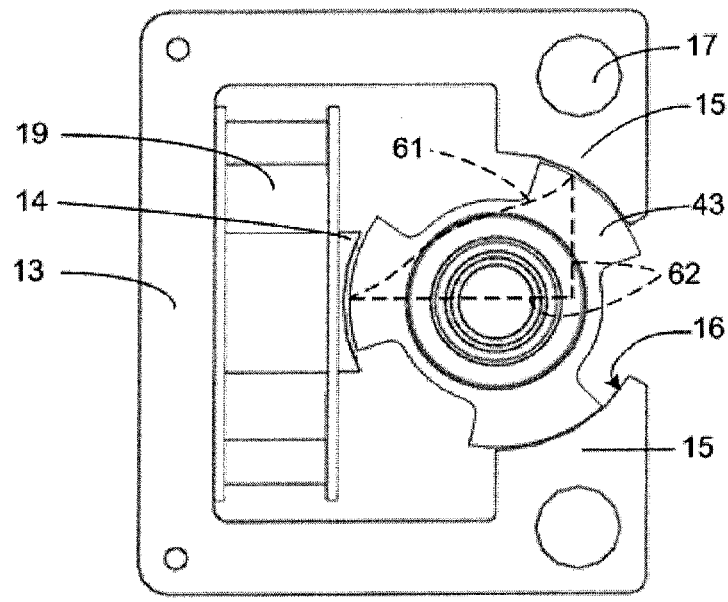
FIG. 4 is a plan view illustrating a stator core and a rotor of the rotary solenoid of FIG. 1 with the rotor at a second position.

When the rotary solenoid 1 is powered up and there is an electric current flowing through the coil 19, the stator poles 14 and 15 generate magnetic field in the cylindrical space 18. The direction and strength of the magnetic field generated in space 18 depends on the direction and magnitude of the electric current flowing in the coil 19. For example, the first stator pole 14 may serve as the North Pole the two second stator poles 15 may serve as the South Poles of the magnetic field. Because the rotor poles 43 are made of a paramagnetic material, the magnetic field in the cylindrical space 18 attracts the rotor poles 43. Under the force of the magnetic field, the rotor poles 43 rotate towards corresponding stator poles 14 and 15 and twist the torsion spring 50. When a balance is reached between the magnetic force and the twisting force of the torsion spring 50, the rotor 40 stays at a second position as shown in FIG. 4. When the power is cut off, the rotor 40 rotates back to the first position under the force of the torsion spring 50.

Because the rotary solenoid 1 employs three stator poles 14 and 15 and three rotor poles 43, the interaction area between the stator 10 and the rotor 40 is bigger than that in a prior art rotary solenoid, and therefore the rotor 40 would generate a greater torque than the prior art rotary solenoid with the same number of turns in the coil and the same electric current. In addition, due to the flux in the first stator pole 14 is divided into two parts at the second stator poles 15, the saturation flux density in the second stator poles 15 is low. This also benefits the output torque of the rotor 40. Further, compared to a same size rotary solenoid described in the background, as the flux path between the first stator pole 14, two rotor poles 43, and the second stator pole 15 is a substantially straight path (as indicated by the dotted line 61 in FIG. 4) shorter than a right angle flux path (as indicated by the dotted line 62 in FIG. 4) of the prior art solenoid, the magnetic reluctance in the stator core 12 and the rotor core 44 is therefore relatively low. This feature also benefits the output torque of the rotor 40. Besides, it is found that the angles of the stator and rotor poles 14, 15, and 43 described above results in good balance between the high torque output and the low cost material in the rotary solenoid 1.

Figure 5:
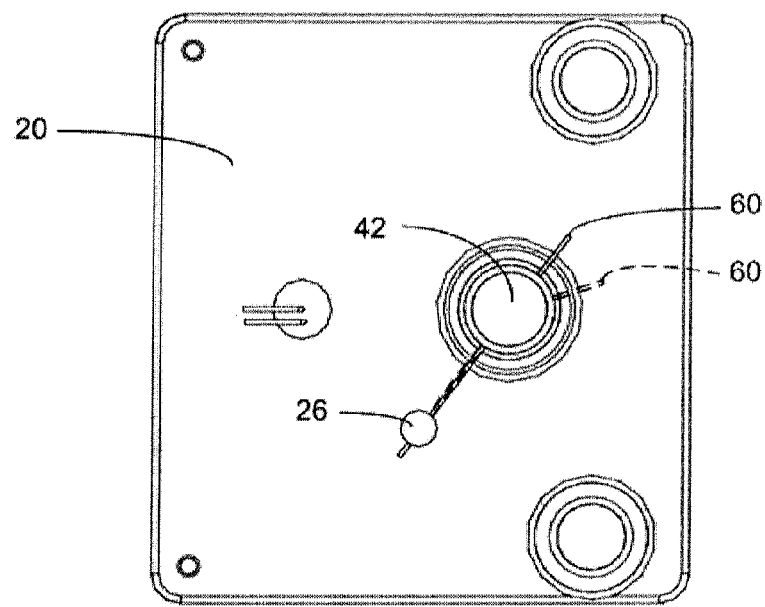
FIG. 5 is a plan view illustrating a rotary solenoid in accordance with another embodiment of the present invention.

It should be understood that the torsion spring 50 is not limited to being that described in herein above. In accordance with the present invention, the torsion spring 50 is capable of driving the rotor 40 to rotate from the second position to the first position when there is no current flowing in the coil 19. In accordance with another embodiment as shown in FIG. 5, the torsion spring can be a strip-shaped torsion spring 60. An end of the torsion spring 60 is fixed to the motion stop pillar 26, while the other end runs radially through the shaft 42. In this embodiment, at the second position, the torsion spring 60 is twisted and shown in dotted line in FIG. 5.

Figure 6:
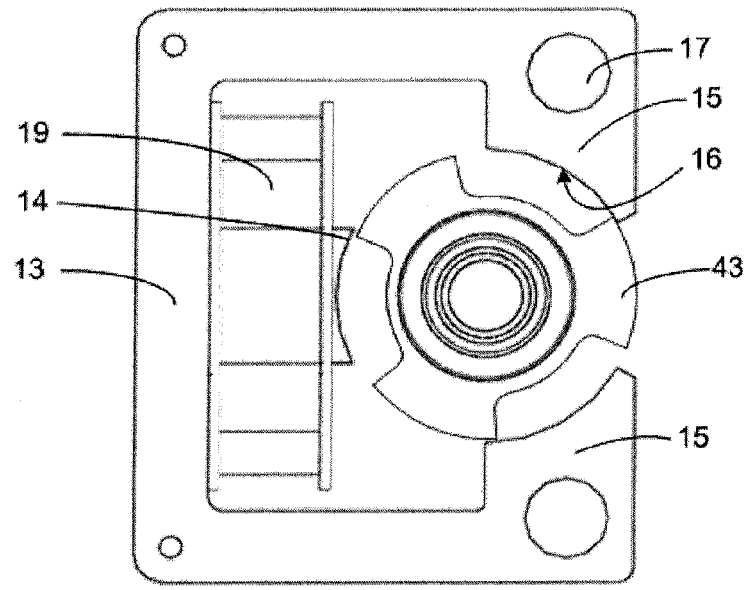
FIG. 6 is a plan view illustrating a rotary solenoid in accordance with yet another embodiment of the present invention.

Referring to FIG. 6, it should be understood that a circumferential end of the rotor pole 43 can overlap with an adjacent stator pole 14 or 15 in the circumferential direction, while the other circumferential end of the rotor pole 43 is spaced from the other adjacent stator pole 14/15.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A rotary solenoid, comprising:
   a stator, comprising:
   an armature having two ends and a central portion there between;
   a first stator pole extending from the central portion of said armature;
   a second stator pole and a third stator pole, each extending from a corresponding one of the two ends of said armature; and
   a coil wound about said first stator pole; and
   a rotor, comprising:
   a shaft rotatably assembled to said stator; and
   a rotor core fixed to said shaft and having three rotor poles corresponding to said first, second, and third stator poles of said stator; and a torsion spring coupled between said stator and said rotor and configured to forcing said rotor to a first position;
wherein said rotor rotates to a second position in response to an electric current flowing through said coil.

2. The rotary solenoid of claim 1, wherein:
said armature includes the elongated central portion and two elongated end portions substantially parallel with each other and substantially perpendicular to the central portion;
said first stator pole extends perpendicularly from the elongated central portion of said armature; and
said second and third stator poles extend from distal ends of the two elongated end portions towards each other.

3. The rotary solenoid of claim 2, wherein:
each of said first, second, and third stator poles comprises an end surface;
the end surfaces of said first, second, and third stator poles are curved, spaced from each other and cooperatively defining a substantially cylindrical space; and
said rotor core is disposed in the substantially cylindrical space defined by said end surfaces of said first, second, and third stator poles.

4. The rotary solenoid of claim 1, wherein:
said three rotor poles are evenly arranged along the circumferential direction of said shaft, and
said first, second, and third stator poles are evenly arranged along the circumferential direction of the shaft.

5. The rotary solenoid of claim 4, wherein:
an angular distance between adjacent stator poles is greater than an angular width of each of said three rotor poles.

6. The rotary solenoid of claim 5, wherein:
at the first position, an circumferential end of the rotor pole align with an adjacent stator pole on the circumferential direction, and
the other circumferential end of the rotor pole spaces from the other adjacent stator pole.

7. The rotary solenoid of claim 5, wherein:
said angular distance of each of said three rotor poles is between 50 to 60 degrees, and
said angular width of each of said first, second, and third stator pole is 1 to 5 degrees greater than that of each of said three rotor poles.

8. The rotary solenoid of claim 1, wherein:
said rotor further includes a spring assembly comprising:
a tube fixed to said shaft;
a flange extending radially from said tube; and
an abutting element extending axially from said flange; and
wherein said torsion spring loosely sleeves said tube, and has a first end assembled to said abutting element and a second end assembled to said stator.

9. A rotary solenoid, comprising:
a stator, comprising:
an armature comprising three stator poles cooperatively defining a substantially cylindrical space; and
a coil wound about one of said three stator poles; and
a rotor, comprising:
a shaft rotatably assembled to said stator; and
a rotor core fixed to said shaft and disposed in the substantially cylindrical space, said rotor core having three rotor poles corresponding to said three stator poles; and
a torsion spring coupled between said stator and said rotor and configured to force said rotor to a first position;
wherein said rotor rotates to a second position in response to an electric current flowing through said coil.

10. The rotary solenoid of claim 9, wherein:
said armature includes two opposing side surfaces substantially perpendicular to said shaft;
said stator further includes two covers fixed to said two opposing side surfaces of said armature, each of said two covers have a fixing hole formed therein;
said shaft is rotatably assembled to said two covers by two bearings arranged in the two fixing holes of said two covers.

11. The rotary solenoid of claim 10, wherein:
said armature includes an elongated central portion and two elongated end portions extending substantially parallel to each other from two opposing ends of the central portion; and
two of the three stator poles extend from distal ends of the two end portions towards each other, the other stator pole extends substantially perpendicularly from the central portion.

12. The rotary solenoid of claim 10, wherein:
said three rotor poles are evenly arranged along the circumferential direction of said shaft, and
said three stator poles are evenly arranged along the circumferential direction of the shaft.

13. The rotary solenoid of claim 12, wherein:
an angular distance between adjacent stator poles is greater than an angular width of each of said three the rotor poles.

14. The rotary solenoid of claim 13, wherein:
the angular distance of each of said three rotor poles is between 50 to 60 degrees, and
said angular width of each of said three stator poles is 1 to 5 degrees greater than that of each of said three rotor poles.

15. The rotary solenoid of claim 10, wherein:
said rotor further includes a spring assembly comprising:
a tube fixed to said shaft;
a flange extending radially from said tube; and
an abutting element extending axially from said flange; and
wherein said torsion spring loosely sleeves said tube, and has a first end assembled to said abutting element and a second end assembled to said stator.

16. A rotary solenoid, comprising:
a stator, comprising:
an armature comprising three stator poles; and
a coil wound about one of said three stator poles; and
a rotor, comprising:
a shaft rotatably assembled to said stator; and
a rotor core fixed to said shaft and having three rotor poles each located approximately between two of said three stator poles; and
a strip-shaped torsion spring having one end fixedly coupled to said stator and another end running radially through said shaft, and configured to force said rotor to a first position;
wherein said rotor rotates to a second position in response to an electric current flowing through said coil; and
at said first position, an circumferential end of each of said three rotor poles overlaps with an adjacent stator pole while an opposing circumferential end of each of said three rotor poles spaces from another adjacent stator pole in the circumferential direction.

17. The rotary solenoid of claim 16, wherein:
said armature includes an elongated central portion and two elongated end portions extending substantially parallel with each other from two opposing ends of the central portion; and two of said three stator poles extend from distal ends of the two end portions towards each other, the other stator pole extends substantially perpendicularly from the said central portion.

18. The rotary solenoid of claim 16, wherein:

said three rotor poles are evenly arranged along the circumferential direction of said shaft, and said three stator poles are evenly arranged along the circumferential direction of the shaft.

19. The rotary solenoid of claim 18, wherein:

an angular distance between adjacent stator poles is greater than and angular width of each of said three the rotor poles.

20. The rotary solenoid of claim 19, wherein:

said angular distance of each of said three rotor poles is between 50 to 60 degrees, and said angular width of each of said three stator poles is 1 to 5 degrees greater than that of each of said three rotor poles.

\* \* \* \* \*